United States Patent
Levy et al.

(10) Patent No.: US 6,497,600 B1
(45) Date of Patent: Dec. 24, 2002

(54) AUTOMATIC PILOT SYSTEM FOR MODEL AIRCRAFT

(76) Inventors: Alejandro Velasco Levy, P.O.Box 109, Upton, NY (US) 11973; Ildiko Palyka, P.O.Box 109, Upton, NY (US) 11973

( * ) Notice: Subject to any disclaimer, the term of this patent is extended or adjusted under 35 U.S.C. 154(b) by 0 days.

(21) Appl. No.: 09/413,200

(22) Filed: Oct. 5, 1999

(51) Int. Cl.[7] .............................................. A63H 27/00
(52) U.S. Cl. ........................... 446/34; 446/61; 446/66; 446/68; 244/199; 244/113; 244/91
(58) Field of Search ............. 446/30, 31, 32, 446/61–68, 487, 488, 34; 244/199, 113, 91

(56) References Cited

U.S. PATENT DOCUMENTS

| | | | | |
|---|---|---|---|---|
| 1,300,564 A | * | 4/1919 | Bkiesath | 446/64 |
| 1,524,313 A | * | 2/1925 | Rumohr | 40/413 |
| 2,588,941 A | * | 3/1952 | Stark | 446/64 |
| 2,597,521 A | | 5/1952 | Pemberton | 46/81 |
| 2,820,322 A | | 1/1958 | White | 46/81 |
| 2,876,585 A | | 3/1959 | Zaic | 46/79 |
| 3,778,926 A | * | 12/1973 | Gladych | 46/79 |
| 3,955,310 A | * | 5/1976 | Renger | 46/78 |
| 3,995,393 A | | 12/1976 | Patterson | 46/79 |
| 4,125,960 A | | 11/1978 | Bacca | 46/79 |
| 4,282,675 A | | 8/1981 | Stripling | 46/81 |
| 4,375,138 A | | 3/1983 | Chotia | 46/79 |
| 4,389,032 A | * | 6/1983 | Meckley | 244/153 R |
| 4,836,817 A | * | 6/1989 | Corbin | 446/62 |
| 4,863,412 A | | 9/1989 | Mihalinec | 446/66 |
| 4,940,195 A | * | 7/1990 | Jackson | 446/487 |
| 4,957,465 A | * | 9/1990 | Dasa | 446/61 |
| 5,007,875 A | * | 4/1991 | Dasa | 446/68 |
| 5,383,805 A | | 1/1995 | Tsai | 446/66 |
| 5,908,341 A | * | 6/1999 | Dasa | 446/61 |

* cited by examiner

*Primary Examiner*—Derris H. Banks
*Assistant Examiner*—Urszula M. Cegielnik

(57) ABSTRACT

An automatic pilot system for a model airplane comprising one or more flexible control elements. When installed on a vertical stabilizer of the airplane, a flexible control element acts as an automatic rudder which provides directional control for the airplane so that it takes off in a straight line at high speed and glides in a circular path of a predetermined radius at low speed. When installed on a horizontal stabilizer of the airplane, a flexible control element acts as an automatic elevator which provides a reduced angle of attack during take-off to minimize the aerodynamic drag, an increased angle of attack during gliding flight to make the flight slower and longer-lasting, and an even greater angle of attack during landing to make the landing even slower for safety. When installed on a wing of the airplane, a flexible control element acts as an automatic dihedral wing tip which provides increased lateral stability for the airplane. When the automatic pilot system utilizes all three types of flexible control elements, it provides full three-dimensional automatic control. Each flexible control element constitutes a single-piece structure which integrates three functionally distinct sections: an attachment section, a flexing section, and a controlling section.

7 Claims, 9 Drawing Sheets

AUTOMATIC PILOT SYSTEM FOR MODEL AIRCRAFT

CROSS-REFERENCE TO RELATED APPLICATIONS

On model gliders, launched by a tow line, this invention is recommended to be used in combination with the automatic tow release system described in our U.S. Pat. No. 6,336,838 issued Jan. 8, 2002. On molded plastic foam models, the impact-absorbing wing connection system, described in our co-pending U.S. patent application Ser. No. 09/413,201, filed Oct. 5, 1999, can also be beneficial. The combination of these three systems produces a model glider that has no mechanically moving parts, yet it is able to take-off, fly and land automatically in a user-selected pattern, and it is sturdy and durable.

BACKGROUND OF THE INVENTION

This invention relates to model airplanes, specifically to an automatic pilot system comprising independent novel rudder, elevator, and wing tip means for automatically guiding the aircraft on a circular flight path following a high-speed take-off in a straight line, automatically adjusting the angle of attack, and providing enhanced lateral stability for the aircraft, respectively.

Many flying toys and model airplanes, such as gliders, are launched with the help of an expanded elastic band that is connected to the airplane through a hook. Upon contraction, the elastic band propels the airplane to fly. The towing results in a high-speed take-off in a straight line. Upon release, however, it is desirable that the glider follow a circular flight path at a lower speed to facilitate a longer gliding time and an easier retrieve upon landing.

Such a flight pattern is achieved on radio-controlled model gliders by the pilot who must actively and continuously adjust the rudder and elevator positions, both while the glider is being towed in a straight path, and while it is gliding slowly in ample circles. However, it is desirable to achieve a similar flight performance with gliders that have no complicated expensive radio control components.

Several U.S. Patents have been granted for mechanisms that work as a limited, or incomplete automatic pilot system for model gliders. However, they do not produce a flight performance that is comparable to that of a radio-controlled plane.

Some of the pilot systems found in the prior art include means for controlling the flight path by adjusting only the elevator position, such as U.S. Pat. Nos. 1,300,564; 2,588,941; 2,597,521; 2,820,322; 3,995,310; 3,995,393; 4,282,675; 4,375,138 and 5,383,805. These systems typically consist of multiple parts, such as hinges, links, rubber bands, elastic time delay mechanisms etc. While they make the glider's transition from a steep climb to a level glide possible, they do not provide automatic directional control for the rudder, hence the glider can only fly in a straight path.

Some small model gliders, launched by a slingshot, utilize the elevators to achieve a circling gliding flight. For example, to make the glider turn left, the left side elevator is bent up, while the right side elevator is bent down. To provide the transition from the steep climb to the level glide, the nose-weight of the glider is adjusted. There are two main disadvantages of this control system: (a) to obtain a fast, steep climb followed by a smooth circling glide, the user is required to have a skillful coordination between orienting the glider's roll angle, aiming the slingshot, and controlling the amount of stretch given to the rubber band, (b) the glider can be launched only to low heights, since this control system cannot be used in combination with a long elastic tow line.

Other mechanisms found in the prior art, achieve the transition from the high speed launch to the low speed glide by changing the position of the main wings, while keeping the position of the elevators unchanged. For example, U.S. Pat. No. 4,125,960 uses an airflow sensor which, upon deceleration, automatically slides the main wings of the glider towards the nose. In U.S. Pat. Nos. 4,836,817 and 4,863,412, both the left, and right wings are rotated to be aligned with the rudder for take-off, and they are held in that position by the air pressure of a fast slingshot launch. After a near vertical climb the glider slows down and a rubber band forces the wings to rotate back to their normal flying positions. The three main disadvantages of these control systems are: (a) they do not provide any directional control since the rudder remains fixed during the launching and gliding phases, (b) they do not make the transition from high speed to low speed a smooth one; generally there is a nose dive or a looping flight before a stable gliding flight is achieved, and (c) they are complicated to manufacture and assemble since they are made of multiple components, such as rubber bands, hinges, links etc.

Still other mechanisms found in the prior art, such as U.S. Pat. No. 2,876,585, control the elevator position by means of a small auxiliary vertical fin, parallel to the rudder. This system provides the necessary means for transition from a fast climb to a low-speed glide and also some directional control, since the auxiliary fin makes the airplane turn. However, this mechanism has four disadvantages: (a) it can only turn the plane in a fixed direction, either left or right, (b) it can provide only slight turning, since the rudder itself is not being controlled, (c) it cannot control the amount of turning independently of the gliding angle of the aircraft, since the positions of the elevator and the auxiliary fin are designed to be linked together, and (d) it is complicated to manufacture and assemble since it is made of multiple elements, such as rubber bands, linkages and active aerodynamic surfaces.

The lateral stability of model aircraft during flight can be enhanced by wings that have larger than zero dihedral angles. Usually, model gliders have wings with dihedral angles of up to about 10 degrees. Having wings with relatively large dihedral angles helps to recover quickly from turbulent gusts of wind. On the other hand, wings with excessive dihedral angles tend to overcorrect, resulting in lateral oscillations, instead of a level flight. In the prior art, increased lateral stability has been frequently added to the glider by rigid wing tips having fixed dihedral angles in the range of about 20–30 degrees. However, these wing tips change the effective dihedral angles of the wings to another fixed value, which cannot be adjusted according to the prevailing flight conditions.

SUMMARY OF THE INVENTION

Accordingly, it is an object of the present invention to provide an automatic pilot system for model aircraft that avoids the disadvantages of the prior art.

More particularly, it is an object of the present invention to provide an automatic pilot system for model aircraft, such as gliders that:

(a) provides full three-axis automatic controllability for the aircraft by having independently movable elevator, rudder, and wing tip components, wherein those components have means for continuously sensing the relative wind speed and means for self-adjusting the positions of their control surfaces accordingly;

(b) does not require radio control or external power to actuate the elevator, the rudder, or the wing tip control surfaces;

(c) makes it possible for the aircraft to climb in a straight path and glide in a circular path;

(d) provides a smooth transition from a high-speed climbing to a low speed gliding;

(e) has control elements that comprise no complicated multiple components, such as rubber bands, hinges, links etc.;

(f) is easy and economical to manufacture;

(g) is simple to install on existing airplanes;

(h) is simple to use;

(i) can be used independently of the launching mechanism; and (j) does not affect the aesthetic appearance of the aircraft.

In keeping with these objects, and with others which will become apparent hereinafter, one feature of the present invention resides in an automatic pilot system comprising one or more flexible control elements of the same basic design, wherein each control element constitutes a single-piece structure so that the means for sensing the relative wind speed, and the means for adjusting the control surface accordingly are provided solely by the geometric design and the material of the control element. The energy for the adjustment of the control surface is derived from the kinetic energy of the wind.

Another feature of the present invention is that, depending on its location on the aircraft, such a flexible control element can act as an automatic rudder, an automatic elevator, or an automatic wing tip.

Still another feature of the present invention is that the automatic pilot system might, in addition to the flexible control elements, also comprise a movable weight, such as a screw, concealed inside the nose of the fuselage to provide means for pre-adjusting the aircraft's gliding angle.

When the flexible control element is used as a rudder, it is set by the user before the launch according to the size of the desired gliding circles. During the high-speed take-off, the rudder automatically adjusts its position so that the glider can fly in a straight path. Once the gliding flight begins, the rudder assumes its preset position to guide the plane in a circular path.

When the flexible control element is used as an elevator, it adjusts its position automatically to provide a low angle of attack in order to minimize aerodynamic drag during the high-speed take-off. Upon the beginning of the free flight, the elevator adjusts itself to facilitate a low speed glide at the preset gliding angle. The automatic elevator is sensitive enough to detect the natural decrease in the prevailing wind speed, as the glider nears the ground. Therefore, it adjusts its position so that the glider's nose is slightly raised and the glider lands at a near horizontal attitude, and a reduced speed.

When a pair of flexible control elements are used as flexible dihedral wing tips, they enhance lateral stability throughout the flight. During normal flight, a small dihedral angle on both wing tips is enough to assure lateral stability of the aircraft, while permitting easy banking turns. If turbulence causes a sideslip, and the strength of a disturbing lateral wind increases, the wing tips automatically increase their dihedral angles in an asymmetrical fashion, so the plane quickly resumes its horizontal position. During take-off, the wing tips increase their dihedral angles symmetrically to avoid dangerous sideslips at a high speed.

When all of the above three types of control elements are used on the same aircraft, the resulting pilot system provides full three-axis automatic control. However, since the individual control elements function completely independent of each other, a user can choose to use one, two, or all three types of them. The weight of the complete automatic pilot system in its preferred embodiment is only about ten grams, thus it can be used even on gliders made of very light material, such as plastic foam.

Since the means for sensing the wind speed and the means for positioning the control surfaces are integrated into a single piece structure in each control element, the present automatic pilot system contains no parts, such as hinges, links, rubber bands etc., that are costly to manufacture and difficult to assemble. The single-piece control elements can be inexpensively manufactured and easily attached to existing model gliders that do not have a moving rudder or a moving elevator.

Since all visible components of the present automatic pilot system can be made of clear plastic, they do not detract from the overall appearance and elegant aerodynamic shape of a well designed glider. Furthermore, they can be used on flying toys shaped other than an airplane, such as birds, fictional characters, etc., that would not normally have rudders, elevators, or wing tips.

On model gliders launched by a tow line, this invention is recommended to be used in combination with the automatic tow release system described in our U.S. Pat. No. 6,336,838. The flight performance of a glider obtained by the combined use of these control systems is similar to that obtained by the use of a radio control system. One significant difference is that the same flight performance and enjoyment is obtained at a much reduced cost.

Additional detailed features of the invention will be best understood from the following description of the preferred embodiments and their accompanying drawings.

BRIEF DESCRIPTION OF THE DRAWING FIGURES

In the drawings, closely related figures have the same number but different alphabetical suffixes.

Figure 6A:
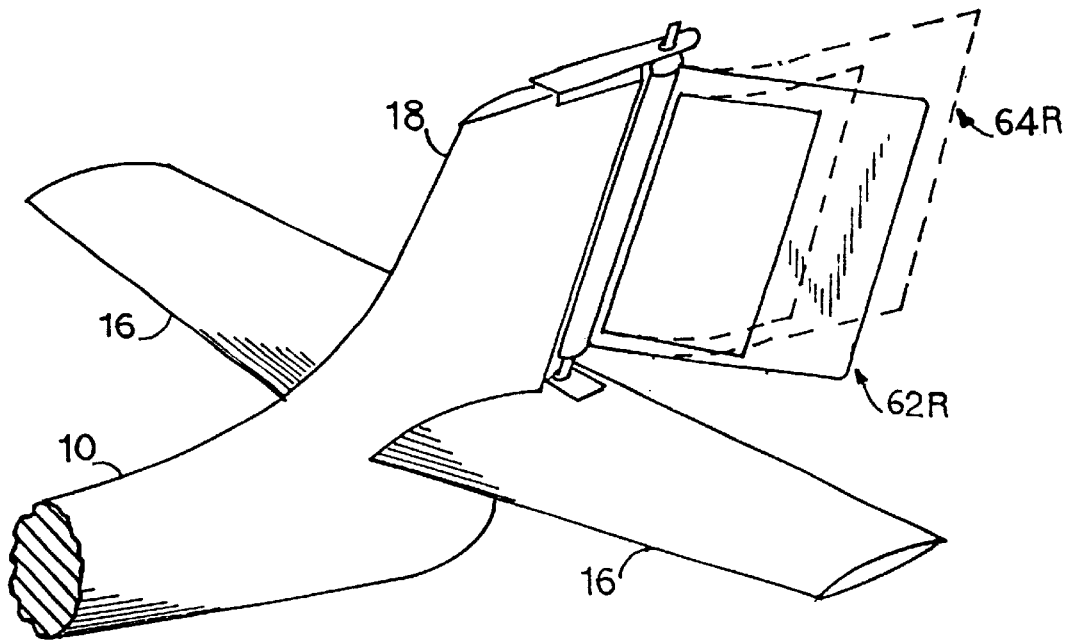

FIG. 6A is a perspective view of the flexible rudder control element, attached to a glider's vertical stabilizer by means of an optional rigid rotating rudder support. In this figure, the resting position of the rudder has been set to an angle of about 45 degrees for a circling gliding flight. During the high speed take-off, the flexible rudder control element will assume the take-off position, indicated by the dashed line.

Figure 6B:
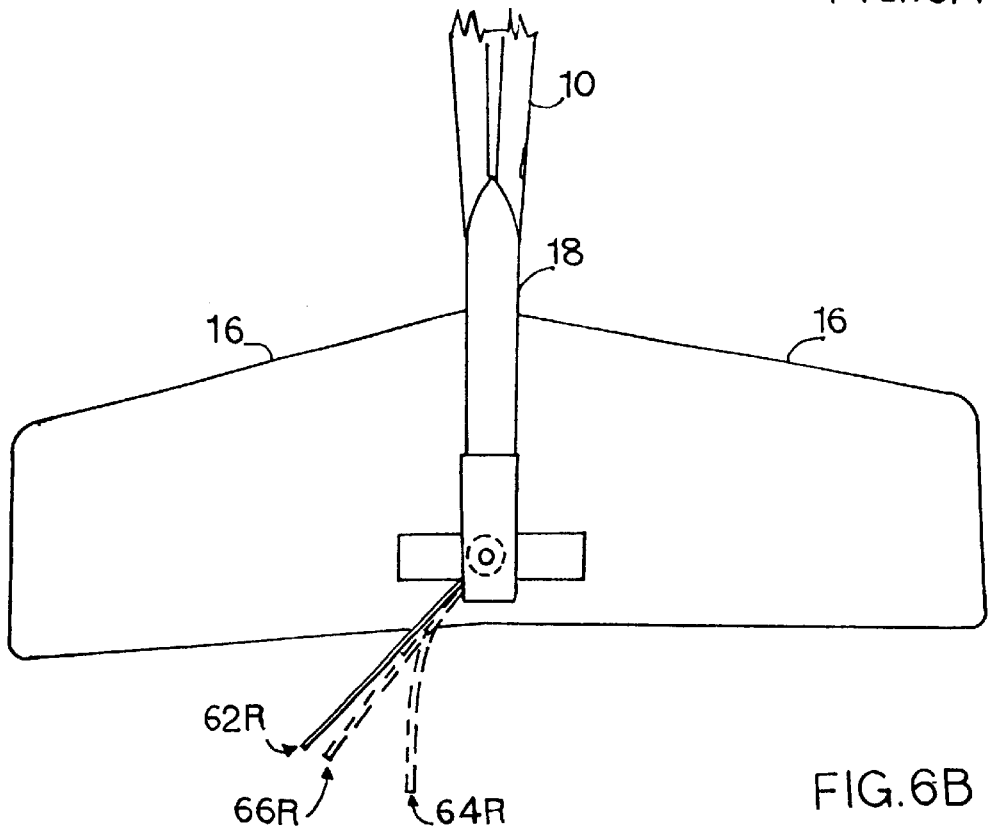

FIG. 6B is a plan view of the flexible rudder control element, attached to a glider's vertical stabilizer by means of an optional rigid rotating rudder support. In this figure, the resting position of the rudder has been set to an angle of about 45 degrees for a circling gliding flight. During the high speed take-off, and the gliding flight, the flexible rudder control element will assume the take-off position and the gliding position, indicated by the dashed lines, respectively.

Figure 7A:
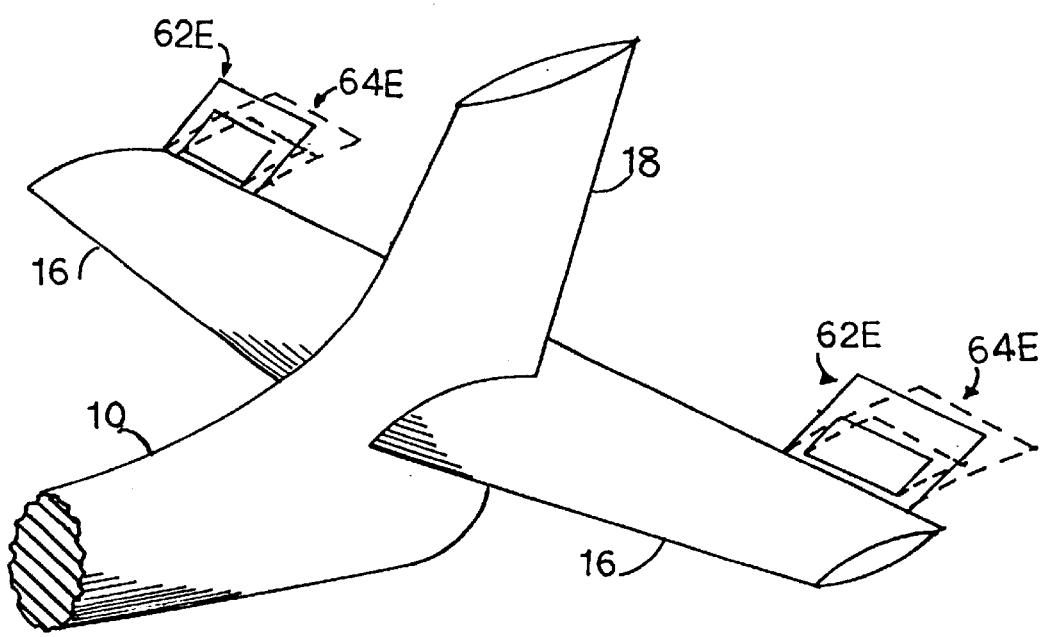

FIG. 7A is a perspective view of a pair of flexible elevator control elements, attached to a glider's horizontal stabilizer. In this figure, the resting positions of both flexible elevator control elements have been permanently set to angles of about 45 degrees for a slow glide. During the high speed take-off, the flexible elevator control elements will assume the take-off positions, indicated by the dashed lines.

Figure 7B:
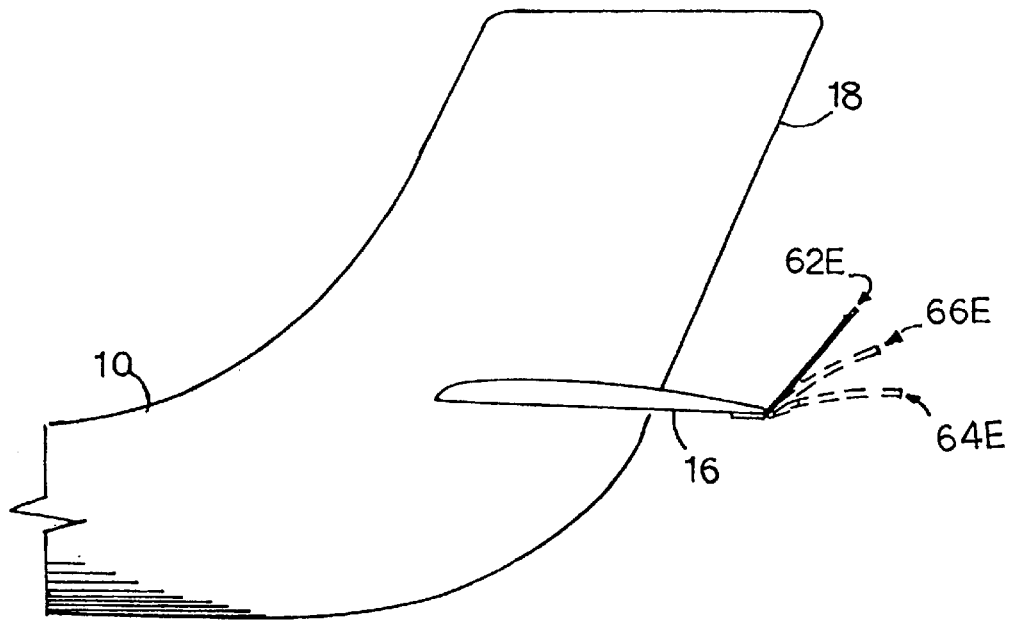

FIG. 7B is a lateral view of a flexible elevator control element attached to a glider's horizontal stabilizer. In this figure, the resting position of the flexible elevator control element has been permanently set to an angle of about 45 degrees for a slow glide. During the high speed take-off, and the gliding flight, the flexible elevator control element will assume the takeoff position and the gliding position, indicated by the dashed lines, respectively.

Figure 8A:
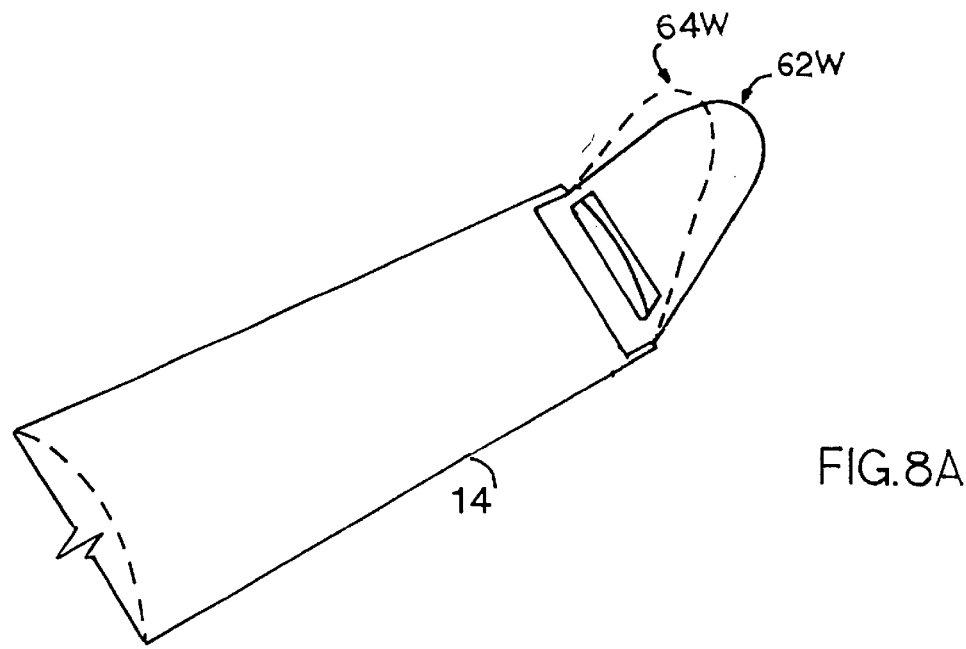

FIG. 8A is a perspective view of a flexible wing tip control element, attached to the tip of a glider's wing. In this figure, the resting position of the flexible wing tip control element has been permanently set to an angle of about 20 degrees for a stable slow gliding flight. During the high speed take-off, the flexible wing tip control element will assume the take-off position, indicated by the dashed line.

Figure 8B:
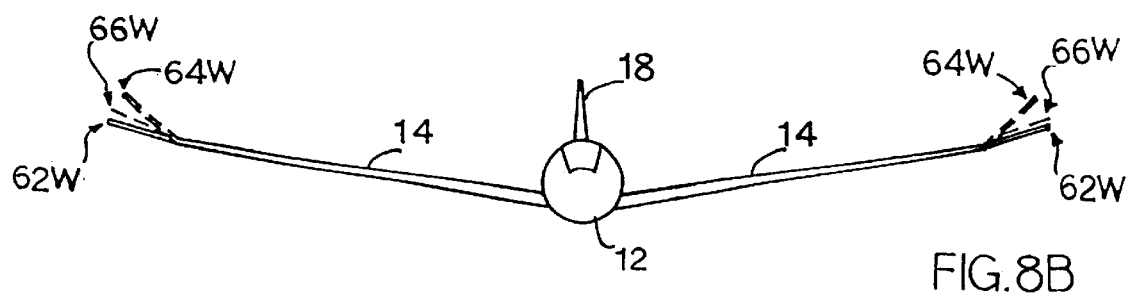

FIG. 8B is a front view of a glider showing the resting position of both flexible wing tip control elements at about 20 degrees. During the high speed take-off, and the gliding flight, the flexible wing tip control elements will assume the symmetric take off position and the symmetric gliding position, indicated by the dashed lines, respectively.

Figure 8C:
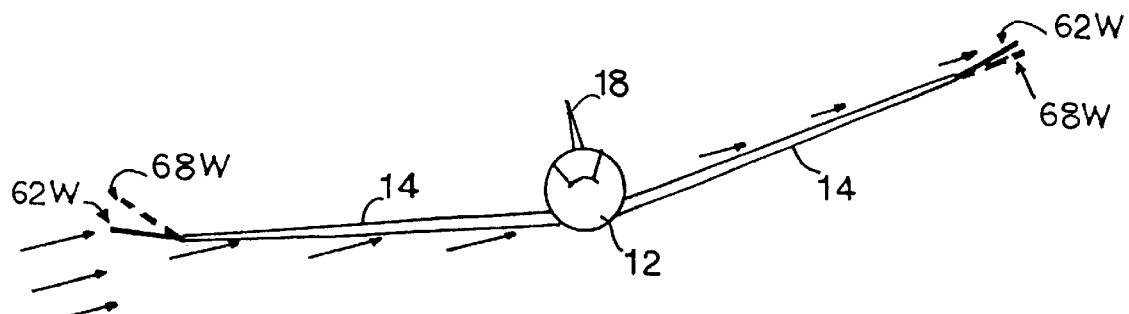

FIG. 8C is a front view of a glider showing the resting position of both flexible wing tip control elements at about 20 degrees. During a side-slip, the flexible wing tip control elements will assume the asymmetric side-slip position, indicated by the dashed lines.

FIGS. 9A to 9D show plan views of several alternative embodiments of a generalized flexible control element.

LIST OF REFERENCE NUMERALS USED IN THE DRAWINGS 10 fuselage
12 nose of fuselage
14 wing
16 horizontal stabilizer
18 vertical stabilizer
20 flexible rudder control element
22 rigid rotating rudder support
24 flexible elevator control element
26 flexible wing tip control element
28 adjustable nose balancing weight
30 access orifice for nose balancing weight
32 attachment section
34 flexing section
36 controlling section
32R rudder attachment section
34R rudder flexing section
36R rudder controlling section
32E elevator attachment section
34E elevator flexing section
36E elevator controlling section
32W wing tip attachment section
34W wing tip flexing section
36W wing tip controlling section
50 upper rudder holder
52 lower rudder holder
54 upper pivot
56 lower pivot
58 upper pivot hole
60 lower pivot hole
62R resting position of flexible rudder
64R take-off position of flexible rudder
66R gliding position of flexible rudder
62E resting position of flexible elevator
64E take-off position of flexible elevator
66E gliding position of flexible elevator
62W resting position of flexible wing tip
64W take-off position of flexible wing tip
66W gliding position of flexible wing tip
68W sideslip position of flexible wing tip

DETAILED DESCRIPTION OF THE INVENTION

The automatic pilot system of the present invention is based on the utilization of one or more flexible integral control elements of the same basic design. Depending on its location on the aircraft, such a flexible control element can act as an automatic rudder, an automatic elevator, or an automatic wing tip.

A flexible control element constitutes a single-piece structure so that the means for sensing the relative wind speed, and the means for adjusting the control surface accordingly are provided solely by the geometric design and the material of the control element. The energy for the adjustment of the control surface is derived from the kinetic energy of the wind. In its preferred embodiment, a flexible control element can be cut out of a single-piece of a thin sheet material that is non-elastic, but flexible, such as Mylar or a similar plastic compound. The thickness of the sheet should be chosen according to the amount of flexibility required by the weight, and speed of the aircraft, on which the control element is to be used.

Figure 1:
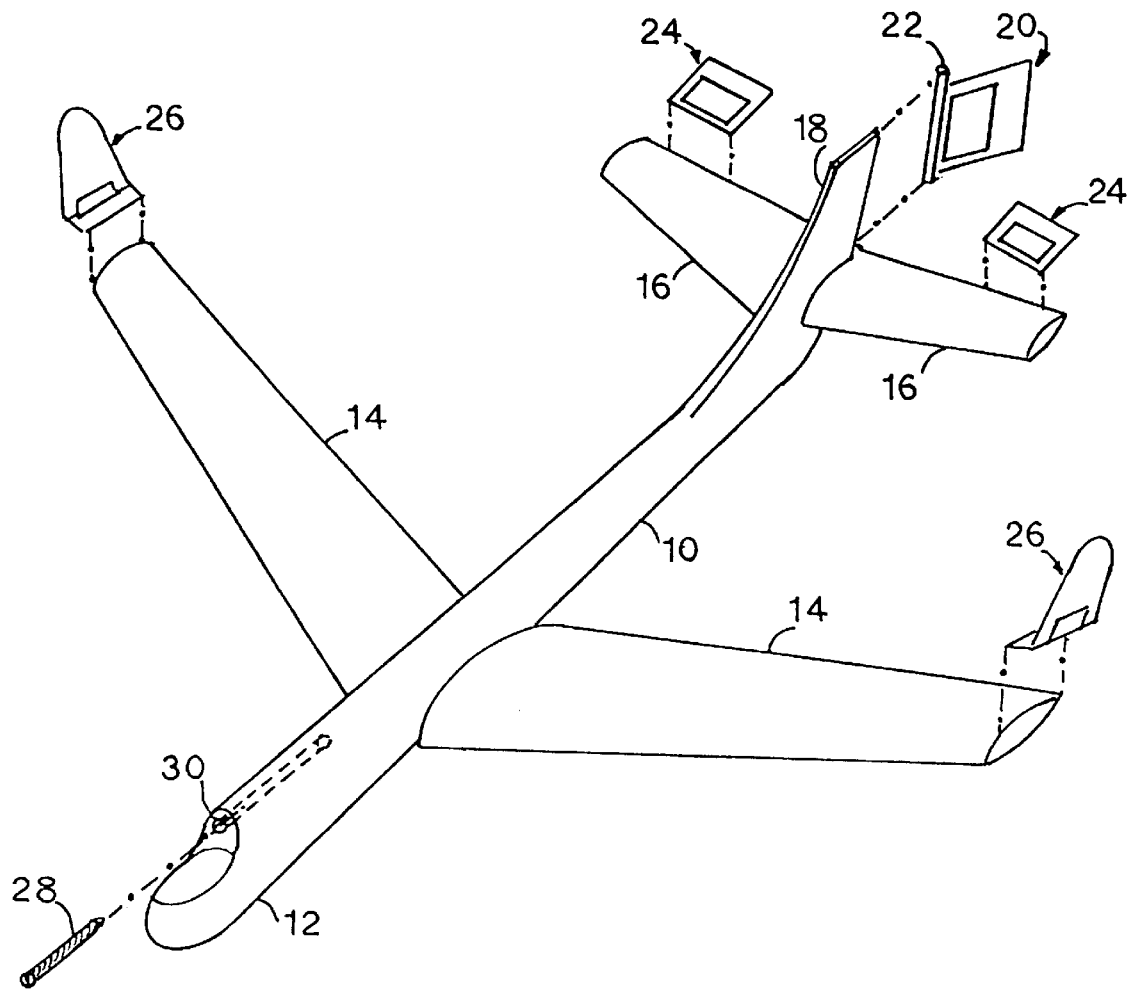
FIG. 1 is an exploded perspective view of a model glider showing the positions of the components of the automatic pilot system in its preferred embodiment.

The preferred embodiment of the automatic pilot system utilizes all three types of flexible control elements for full three-dimensional automatic control. It is illustrated in FIG. 1, which is a perspective drawing of a model glider, typical of the type made of plastic foam. Such gliders typically comprise a fuselage 10, wings 14, a horizontal stabilizer 16, and a vertical stabilizer 18. The flexible control elements of the automatic pilot system can be easily, and non-invasively installed on the existing glider by simple adhesive means, either in the form of an adhesive tape or some liquid glue.

One control element is attached to fixed vertical stabilizer 18, where it acts as a flexible rudder control element 20. A pair of control elements are attached to the left and right sides, respectively, of fixed horizontal stabilizer 16, where they act as flexible elevator control elements 24. Another pair of control elements are attached to wings 14, where they act as flexible wing tip control elements 26. In the preferred embodiment, each control element is made of a clear, transparent material (Mylar), so they are practically invisible during flight, and they do not detract from the elegant shape of the glider.

The drawing shows flexible rudder control element 20 attached to fixed vertical stabilizer 18 through a rigid rotating rudder support 22. The use of rudder support 22 is optional, but strongly recommended, since it makes flexible rudder control element 20 easily adjustable to any desired resting position. The other flexible control elements are attached to their appropriate locations directly, since they can be permanently set to an optimized resting position.

Another optional, but strongly recommended component of the automatic pilot system is an adjustable nose balancing weight 28 hidden in nose 12 of fuselage 10. In the preferred embodiment, nose balancing weight 28 is a metal screw whose position can be adjusted through a small access orifice 30. By slightly adjusting the position of nose balancing weight 28, the user can pre-select the gliding angle of the aircraft that will be kept stable during flight by flexible elevator control elements 24. Nose balancing weight 28 is also useful for compensating for the slight posterior weight increase when the automatic pilot system is installed on an existing glider.

Figure 2:
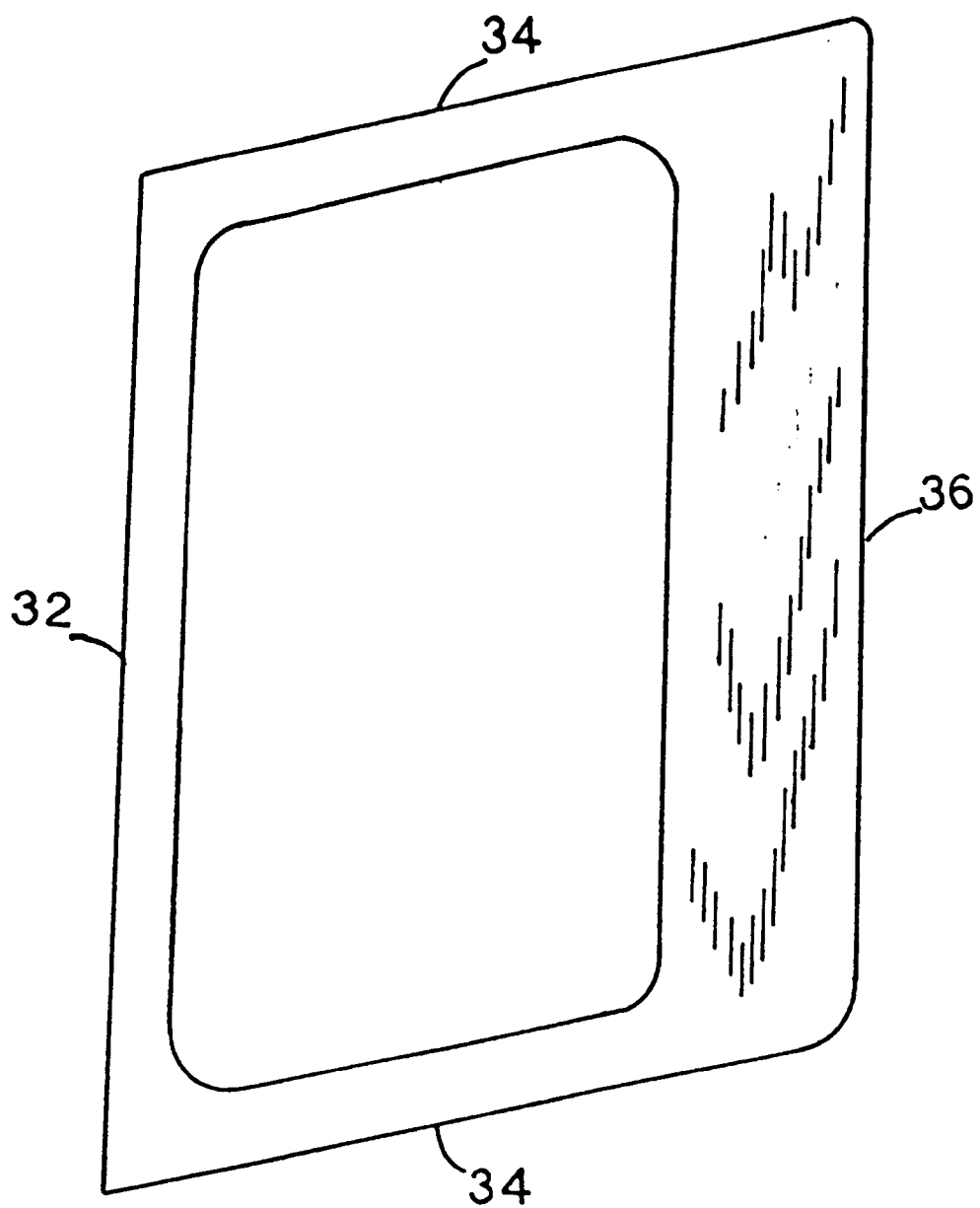
FIG. 2 is a plan view of a generalized flexible control element showing its three functional sections.

FIG. 2 shows a plan view of a generalized flexible control element. The aerodynamic properties of the control element depend only on its geometric shape, and the type and thickness of material used in its manufacture. In its preferred embodiment, the control element is made of a single piece of material (Mylar). The control element integrates three sections that are distinguished based on the functions they perform: an attachment section 32, a flexing section 34, and a controlling section 36. By definition, the attachment section is the part that is physically used to attach the control element to an appropriate surface on the glider. The controlling section is the part that exerts directional control over the movement of the aircraft. The flexing section is the part whose flexibility is greater than that of the controlling section (either because of its reduced width or reduced thickness). The flexing section senses the air pressure exerted over the surface of the controlling section by the relative movement of air molecules. It responds to changes in this air pressure by reversibly bending and thus, it changes the direction of the controlling section. The amount of directional change induced by a given amount of air pressure change depends on the size, shape, and material of the control element.

In the preferred embodiment, flexing section 34 comprises two discrete reduced-width members, or legs, that are joined only by the other functional sections. Since it is its functionality that defines each section, we will continue to refer to the flexing section as a single entity throughout the description, regardless of the number of discrete members it has. In this configuration, the flexing section also has a reduced surface area, as opposed to a "continuous" flexing section where the increased flexibility is achieved through a reduced thickness. This is very beneficial for the performance of the control element, since the air pressure exerted on the flexing section itself will be negligible compared to the air pressure on the controlling section. If the width of the flexing section were the same as that of the controlling section, a change in air pressure would affect both sections, reducing the performance of the control element. Such a control element could still be used, but the preferred embodiment is definitely the one in which the flexing section has a reduced surface area. Furthermore, the performance and stability of the control element is much better if the flexing section comprises two "legs" as opposed to a single reduced-width section.

Figure 3A:
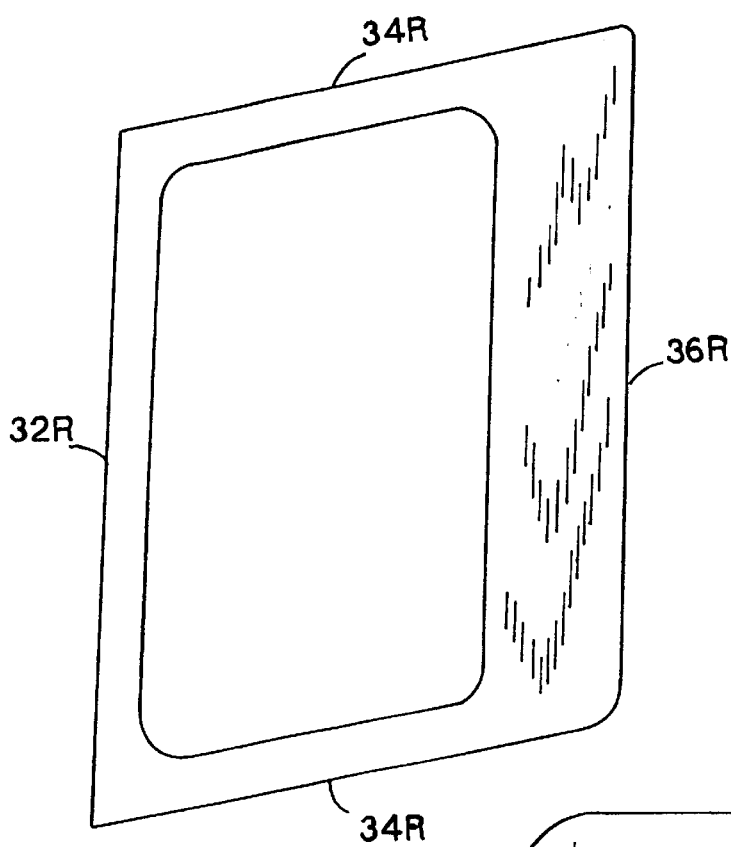
FIG. 3A is a plan view of the preferred embodiment of the flexible rudder control element.
Figure 3B:
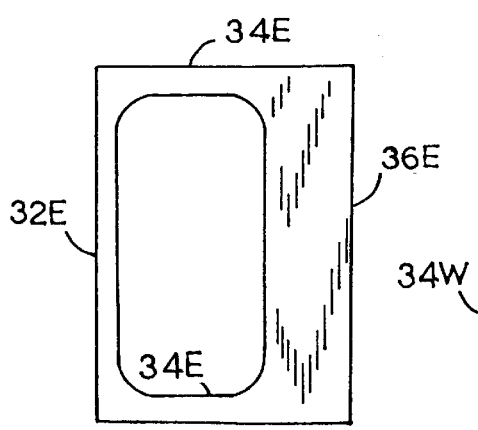
FIG. 3B is a plan view of the preferred embodiment of the flexible elevator control element.
Figure 3C:
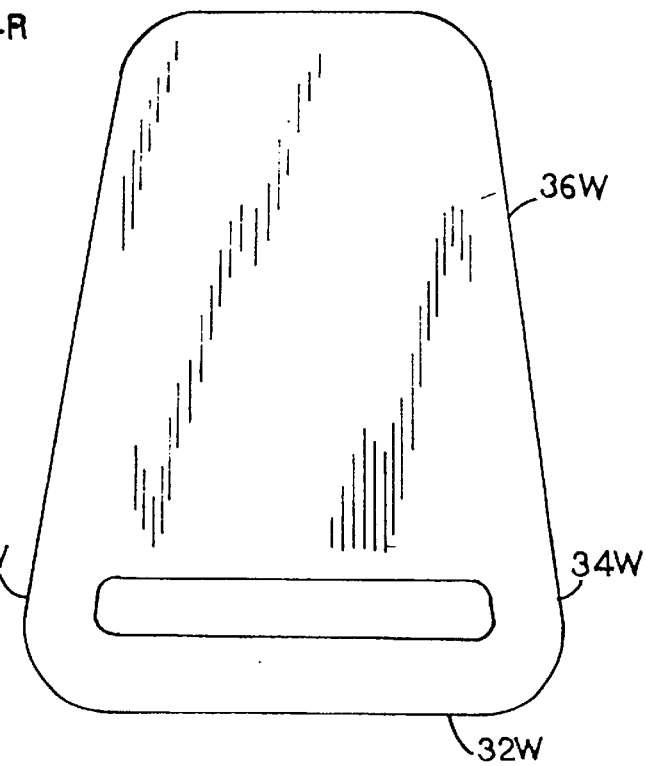
FIG. 3C is a plan view of the preferred embodiment of the flexible wing tip control element.

The relative shapes and sizes of the functional sections may vary according to the type of the control element and the type of aircraft on which they are to be used. FIGS. 3A–3C show detailed plan views of the preferred embodiments of a rudder, an elevator, and a wing tip control element, respectively. The relative sizes of the three control elements, and the relative dimensions of their functional sections are shown in the drawings as an illustration of their typical relative sizes. However, these dimensions, although realistic, are suitable only for one particular rigid foam glider. For other gliders, and flying toys, the control elements must be rescaled according to the size, weight, and flying speed of the model.

As shown in FIG. 3A, the rudder control element has a rudder attachment section 32R, a rudder flexing section 34R, and a rudder controlling section 36R. FIG. 3B illustrates the smaller dimensions used for elevator attachment section 32E, elevator flexing section 34E, and elevator controlling section 36E. The wing tip control element shown in FIG. 3C comprises wing tip attachment section 32W, relatively small wing tip flexing section 34W, and relatively large wing tip controlling section 36W.

To obtain the correct amount of resilience in their flexing sections, different control elements of the same automatic pilot system might be manufactured of materials of different thickness. For example, for a light plastic foam glider, the rudder and wing tip control elements can be made of 0.25 mm (0.010 in) thick Mylar, while the elevator control element can be made of 0.13 mm (0.005 in) thick Mylar. If required by other flying toy designs, any of the functional sections of a control element can be locally reinforced by a second layer of an appropriate material. The integral control elements can also be molded in a single piece of varying thickness, instead of being stamped out from a single sheet of uniform thickness.

Each control element can be attached to its appropriate location on the aircraft through its integrated attachment section. The simplest way to secure them is by adhesive means. In the preferred embodiment, the flexible elevator and flexible wing tip components of the automatic pilot system are fastened to the glider body by clear adhesive tape (not shown in the drawings).

Figure 4A:
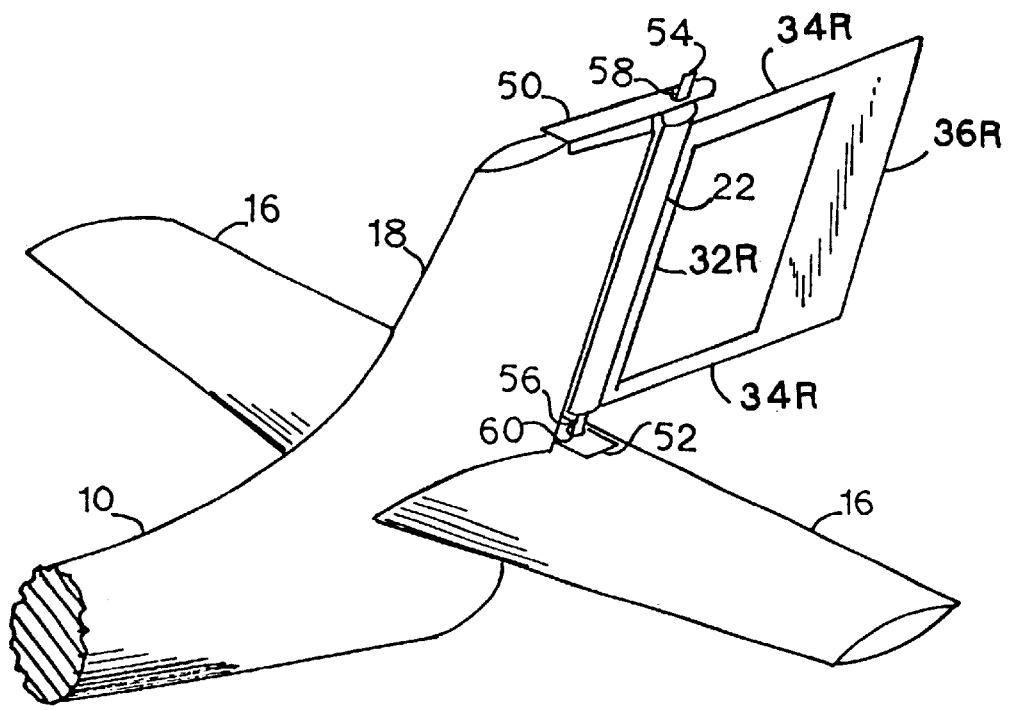
FIG. 4A is a perspective view of the flexible rudder control element, attached to a glider's vertical stabilizer by means of an optional rigid rotating rudder support. In this figure, the flexible rudder control element has been set to a resting position at an angle of 0 degrees for a straight flight path at any air speed.
Figure 4B:
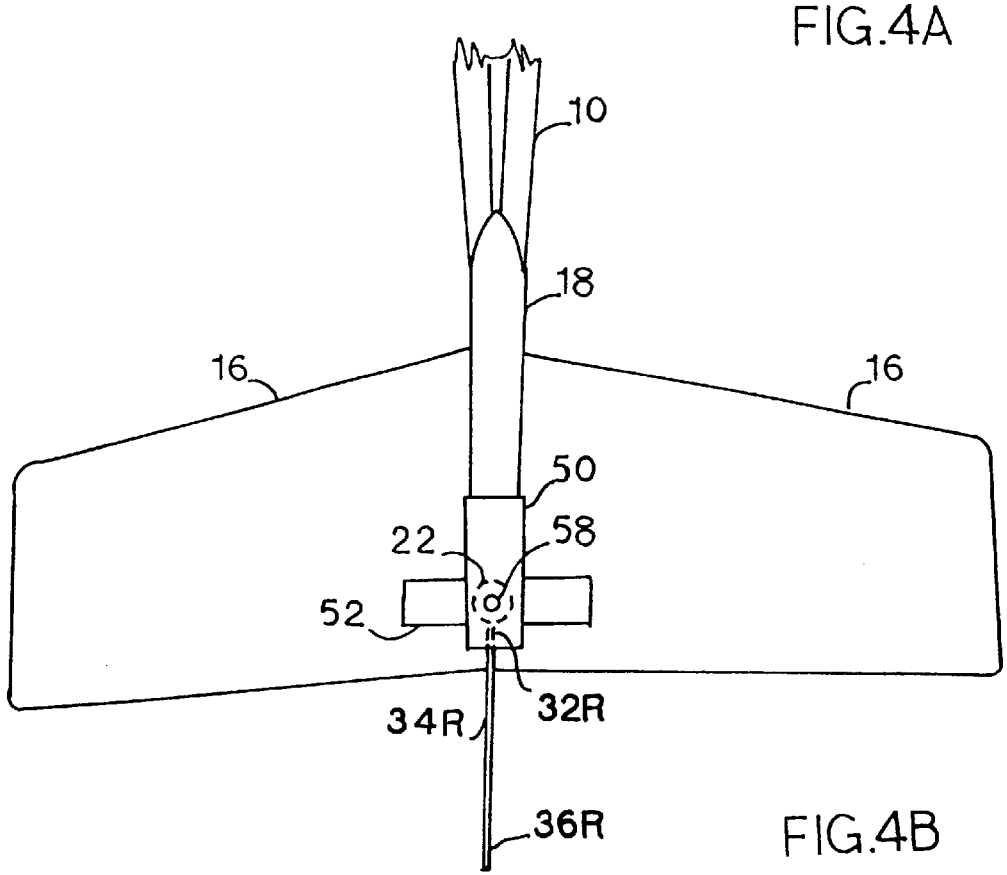
FIG. 4B is a plan view of the flexible rudder control element, attached to a glider's vertical stabilizer by means of an optional rigid rotating rudder support. In this figure, the flexible rudder control element has been set to a resting position at an angle of 0 degrees for a straight flight path at any air speed.

Flexible rudder control element 20, however, is installed on the airplane through rigid rotating rudder support 22, as shown in FIGS. 4A and 4B, a perspective and a plan view of the glider's tail, respectively. This provides the user with a convenient way to preset the angle of the flexible rudder for the required flight pattern. As shown in the drawings, rudder attachment section 32R is attached to rigid rudder support 22 that can rotate with respect to the aircraft's vertical stabilizer 18. Support 22 is held in place by upper 50 and lower 52 rudder holders, respectively. The two ends of support 22 terminate in upper 54 and lower 56 pivots, respectively, which fit into upper 58 and lower 60 pivot holes, respectively, in upper 50 and lower 52 rudder holders, respectively. Rigid rudder support 22 can be rotated to the desired angular position and secured in this position by an adhesive tape or other securing means. FIGS. 4A and 4B show the flexible rudder control element set to a resting angle of 0 degrees for a straight flight path.

The entire rudder support assembly can be made of any light-weight, impact-resistant, rigid material, such as polycarbonate or other plastic substance. The attachment section of the rudder control element can be secured to the rigid rotating support by any appropriate means, for example, it can be inserted into a slot in the body of the rigid rotating support.

Figure 5A:
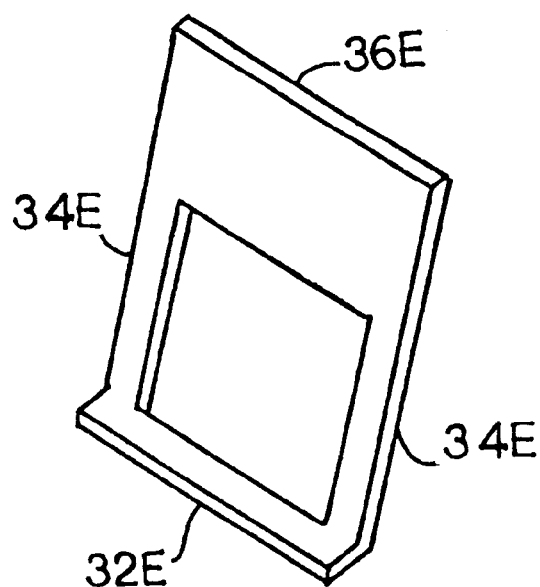
FIG. 5A is a perspective view of the preferred embodiment of the flexible elevator control element, after the angle between its attachment section and flexing section has been permanently set to about 45 degrees.
Figure 5B:
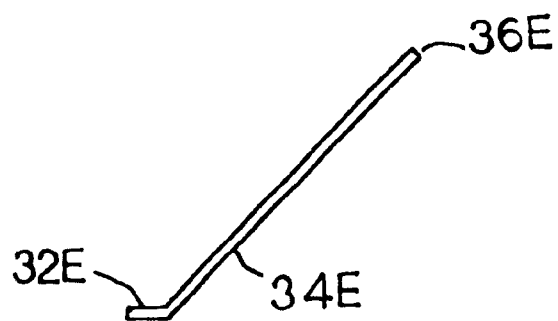
FIG. 5B is a lateral view of the preferred embodiment of the flexible elevator control element, after the angle between its attachment section and flexing section has been permanently set to about 45 degrees.

On a particular glider, the flexible elevator and wing tip control elements have an optimum predetermined angular position, which, under normal conditions, should not require adjustment by the user. For this reason, and to keep the automatic pilot system as simple as possible, the optimum angle between the attachment section and the flexing section of these control elements can be permanently set by the manufacturing process. FIGS. 5A and 5B show perspective and lateral views, respectively, of an elevator control element, with a permanent set angle of about 45 degrees between its attachment section 32E and flexing section 34E. The optimum angle for an analogous wing tip control element is about 20 degrees. When such a control element is attached to the glider through its attachment section, the preset angle will pertain with respect to the glider. Similarly, a resting angle between the flexing section and the controlling section of a flexible control element can be permanently set, when required.

Depending on the type of material and the process used in the manufacturing of the flexible control element, there are several ways of making it permanently bent. When the control element is cut out of a flat sheet of plastic material, it can be permanently set to the required angle by heat. If the type of material permits, it can also be bent by pressure beyond the flexibility of the material, so it stays angled after it is released. If the control element is manufactured by molding, the mold can be easily designed to the desired three-dimensional shape. If the functional sections of the control element are cut or molded separately they can be fused into one integral piece so that it has the required angle.

The operation of the individual components of the automatic pilot system can be best understood from the following figures.

FIGS. 6A and 6B show perspective and plan views, respectively, of the flexible rudder control element, installed on the glider's vertical stabilizer. FIG. 6A shows the flexible rudder in resting position 62R at an angle of about 45 degrees. This setting would result in a circular gliding flight at a low relative air speed. However, during a high-speed take-off, the air pressure on the rudder controlling section is high enough to bend the rudder flexing section to a take-off position 64R, indicated with dashed lines in FIGS. 6A and 6B. When the flexible rudder control element is in take-off position 64R, the force it exerts on the fuselage is too small to deter the glider from a straight take-off path. During the gliding flight, the air speed is relatively low, therefore the flexible rudder's gliding position 66R (which is very close to its resting position 62R) directs the glider on a circular flight path.

The gliding angle of an aircraft is most strongly determined by the position of its main horizontal stabilizer 16 with respect to fuselage 10, both shown in FIG. 1. On most model gliders, this angle is somewhat adjustable, however it stays fixed during a flight. On models with fixed horizontal stabilizers, the user can fine-tune the gliding angle before the flight by adjusting nose balancing weight 28, also shown in FIG. 1. In the preferred embodiment, nose balancing weight 28 is a metal screw, whose position can be easily adjusted by just a few turns with a small screwdriver through access orifice 30. This will move the screw a few millimeters in or out of nose 12 of fuselage 10, slightly changing the center of gravity of the glider.

Automatic changes in the angle of attack during take-off and in the gliding angle of the aircraft can be continuously performed by the flexible elevator control element of the automatic pilot system. FIGS. 7A and 7B, a perspective and a plan view of the glider's tail, respectively, show that the flexible elevator control element is attached directly to fixed horizontal stabilizer 16 of the glider. The drawings show the flexible elevator in a resting position 62E at an angle of about 45 degrees. This setting would facilitate a slow gliding flight. However, during the high-speed take-off, the air pressure on the elevator controlling section is high enough to bend the elevator flexing section to a take-off position 64E, indicated with dashed lines in FIGS. 7A and 7B. When the flexible elevator is in take-off position 64E, it exerts a reduced downward force on the glider's tail. Thus, the glider assumes a lower angle of attack, reducing the aerodynamic drag, and facilitating the high-speed of the take-off. During the gliding flight, the air speed is relatively low, therefore the flexible elevator's gliding position 66E (which is close to its resting position 62E) makes the glider free-fly at a reduced speed.

It is known that the velocity profile of prevailing winds decreases parabolically with height. Near the ground, the prevailing wind speed approaches zero. The flexible elevator control element is sensitive enough to detect this natural decrease in wind speed, as the glider nears the ground. As the air pressure on the elevator controlling section decreases, the control element's position approaches its resting position 62E (shown in FIGS. 7A and 7B) even further, pushing the glider's tail down and its nose up. Therefore, the glider lands in a realistic landing position, and at a safer lower speed.

The ideal glider would have wings with variable dihedral angles that are large at the beginning of a disturbing wind gust, so that the recovery to level wing attitude is fast, but then decrease, in order to avoid overcorrecting, and lateral oscillations. With the use of the proposed flexible wing tip elements, one can closely simulate such self-adjusting wings.

FIG. 8A, a perspective view of the bottom of wing 14 of a glider, shows that the flexible wing tip control element is attached directly to the wing through attachment section 32W. The drawing shows the flexible wing tip in resting position 62W at a dihedral angle of about 20 degrees, which is enough to provide lateral stability during a slow gliding flight. However, during the high-speed take-off, the angle of attack is large enough and the air pressure on wing tip controlling section 36W is high enough to bend wing tip flexing section 34W to take-off position 64W (indicated with dashed lines in FIG. 8A, and also in FIG. 8B that is a front view of the glider) at an angle of about 45 degrees. This symmetrically increases the overall dihedral angle of the wings, resulting in a steady straight take-off with no side slips. During the gliding flight, the air speed is relatively low, therefore the flexible wing tip assumes gliding position 66W (which is close to its resting position 62W, as shown in FIG. 8B) which provides adequate lateral stability at low speeds.

If, during the gliding flight, a side-slip occurs due to turbulence, then the flexible wing tip control elements change their positions so that they help the glider resume its normal flight. A side-slip is illustrated in FIG. 8C, another front view of the glider. The arrows in the drawing indicate the lateral wind speed and the wind direction over the wings. Because of the interference of the fuselage, the lateral wind speed on the high wing is less than that on the low wing. Therefore, the flexible wing tip control elements assume asymmetrical sideslip position 68W shown with a dashed line in FIG. 8C. The low flexible wing tip control element increases its dihedral angle substantially, while the high flexible wing tip control element decreases its dihedral angle only by a smaller amount. The overall effect of sideslip position 68W is that the glider returns to its horizontal position much faster than it would with the help of rigid wing tips. Once the side-slip has been corrected and the wings are level again, the flexible wing tips' gliding position with an overall smaller symmetrical dihedral angle is resumed, and overcorrecting, which can lead to undesirable lateral oscillations, is avoided. The faster return to level wing attitude without oscillations is a definite improvement over what could be achieved with the use of state of the art fixed rigid wing tips.

Thus, the reader can see that the automatic pilot system of the invention provides full three-dimensional automatic control for model aircraft and other flying toys, and in a form that is easy to manufacture, install, and use. On model gliders launched by a tow line, the automatic pilot system is recommended to be used in combination with the automatic tow release system, described in our U.S. Pat. No. 6,336,838. The automatic tow release system launches the glider at a high speed, so the flexible rudder control element of the present invention facilitates a straight climb, fully utilizing the pulling force of the elastic tow line. The tow release system disengages the tow line when the glider is at optimum height and speed to start a slow free flight in a circular path, the size of which is determined by the preset position of the flexible rudder control element.

While the above description contains many specificities, these should not be construed as limitations on the scope of the invention, but rather as an exemplification of one preferred embodiment thereof. Many other variations are possible. For example, the automatic pilot system may comprise only one or a combination of several different types of flexible control elements, depending on the needs of the user. For instance, if the lateral stability of the aircraft is addressed by some other means, the user might need only the flexible rudder control element, or a combination of the flexible rudder and the flexible elevator control elements for the automatic pilot system. Also, the number of flexible control elements of the same type used on one airplane should not be considered limited to what has been described in the preferred embodiment. For instance, there might be a single elongated flexible elevator control element, or a plurality of smaller flexible elevator control elements used on an aircraft.

The location of the flexible control elements can also differ from what has been demonstrated in FIG. 1. To sustain this statement it is mentioned that the terms vertical stabilizer and horizontal stabilizer are used throughout the description in their broadest meanings. For example, a flexible rudder control element can be installed on any appropriate vertical member, such as on a fixed vertical wing tip used on certain aircraft models. A flexible elevator control element can be installed on any appropriate horizontal member, such as on a tail that is positioned ahead of the wing (Canard configuration).

Even though the automatic pilot system has been demonstrated on a model glider, it can also be used on flying toys not shaped as an airplane, such as birds, fictional characters, etc. Since all the external components of the pilot system can be manufactured of transparent materials, they would appear invisible during flight, and they would not destroy the appearance of flying toys that do not normally have rudders, elevators, or wing tips. The flexible control elements could be attached to an appropriate surface on the aerodynamically shaped flying object.

In the preferred embodiment, the flexible rudder control element has been secured to the airplane through a rotating rudder support. The design of the rudder support could be different as long as it performs its function. In another embodiment, the flexible rudder control element can be bent to have a certain angle and attached to the airplane directly, as it has been demonstrated for the elevator and wing tip control elements. Conversely, the other control elements could be secured to the airplane through some adjustable or fixed support means.

Another obvious change over the preferred embodiment is when the adjustable nose balancing weight is omitted. This is practical if the glider has other means for adjusting the position of its center of gravity.

Figure 9:
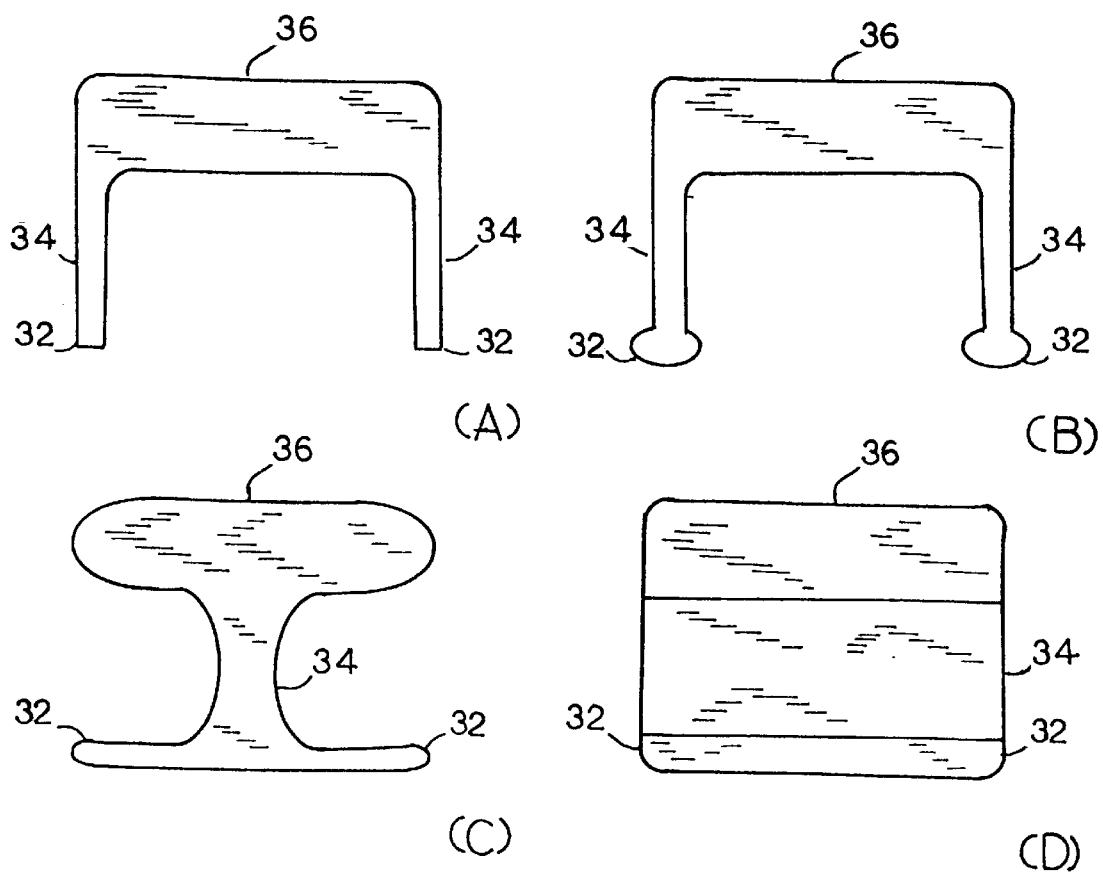

The design of the individual flexible control elements can also be different from their preferred embodiments. Several possible alternative embodiments of a generalized flexible control element are illustrated, without detail, in the plan view drawings of FIGS. 9A to 9D. For example, attachment section 32 of a control element can comprise several discrete members, as opposed to the continuous attachment section of the preferred embodiment. Two such configurations are shown in FIGS. 9A and 9B. The increased flexibility of flexing section 34 can be provided by its reduced width compared to the controlling section. In the preferred embodiment, and also in FIGS. 9A–9B, the flexing section comprises more than one reduced-width members. FIG. 9C shows a control element with a single-component flexing section. This figures also demonstrates that the flexing section can have non-linear contour. Alternatively, a control element can have a uniform width throughout, as shown in FIG. 9D. In this case, flexing section 34 can be manufactured to have a reduced thickness compared to controlling section 36. This is quite feasible if the control element is manufactured by a molding process. If the control element is made of a flexible material so that it has a uniform thickness throughout, its controlling section and/or attachment section may be locally reinforced with additional layers of the same material or other appropriate materials. Even when flexing section 34 has a reduced width, additional flexibility may be provided by reducing its thickness as well.

The relative sizes and shapes of the attachment section, flexing section, and controlling section of different control elements can also be modified to fit the flying object on which they are to be installed.

In the preferred embodiment, the flexible control elements are manufactured of clear Mylar and so they are invisible during flight. However, if one wishes to use them also for decorative purposes, they can be manufactured of feasible materials of any color. They can consist of any material which retains its basic shape and size within the conditions of the operation, whose flexibility can easily be controlled by changing its width and thickness, and whose weight is light compared to the aircraft. Some examples are nylon, vinyl, tear-resistant paper, certain thin sheet metals, etc. Although one of the most important features of the flexible control element is its integral nature, it's functional sections could also be manufactured separately, and then fused together to form the integral piece. In such case, the flexing section can be made of a different material than the attachment and controlling sections. This can provide an additional way of controlling its flexibility, besides the width and thickness, mentioned above.

Accordingly, the scope of the invention should be determined not by the examples given, but by the appended claims and their legal equivalents.

What is claimed is:

1. An automatic pilot system that can be used in combination with an already existing model airplane, which has a fixed wing, fixed vertical and horizontal stabilizers, as well as a fixed rudder and fixed elevator, thus lacking any controllable elements during its flight; the automatic pilot system comprises one or a combination of the following control elements, which are externally attached to said model airplane to provide means for controlling and stabilizing said model airplane;

(a) a flexible rudder control element;
   (b) two flexible elevator control elements;
   (c) two flexible wing tip control elements wherein said flexible control elements are made from a flexible plastic sheet; each of said flexible control elements being substantially thin and flat and so flexible that its relative angle to the body of said model airplane changes continuously and reversibly as the air speed of said model airplane changes;

said five flexible control elements of the proposed automatic pilot system allow for the continuous automatic control of one or a simultaneous combination of the following angles; the pitch angle, the yaw angle and the roll angle of the model airplane thereby attaining a stable flight;

said flexible control elements pilot said model airplane on a circular gliding flight path following a high speed take-off in a straight line.

2. An automatic pilot system as defined in claim 1, wherein each of said control elements comprises a controlling section and a flexing section; the area of the rudder controlling section of said flexible rudder control element is substantially the same as the area of said fixed rudder of said model airplane; the area of the wing tip controlling section of each flexible wing tip control element is substantially the same wing tip area of said fixed wing of said model airplane and has substantially the same shape as the wing tip of said fixed wing of said model airplane; the area and shape of the elevator controlling section of said flexible elevator control element are substantially the same as the area and shape of said fixed elevator of said model airplane; furthermore, in addition to said controlling section areas, each one of the flexible control elements has two flexing sections that connect said controlling section areas to said model airplane, said flexing sections are made from said flexible plastic sheet; the length, thickness and width of said flexing sections is determined by test flights of said model airplane in a gliding flight so that the gliding flight lasts as long as possible.

3. An automatic pilot system as defined in claim 2, further comprising a rotating support attached to said vertical stabilizer of said model airplane, wherein the ends of said flexing sections of said flexible rudder control element are secured to said rotating support; the angular position of said rotating support element with respect to the vertical stabilizer can be selected by the pilot when said model airplane is at rest, wherein said flexible rudder control has a fixed selected angle with respect to said vertical stabilizer when said model airplane is at rest; since this angle is substantially the same as the angle of said flexible rudder during slow gliding flight, the pilot is thereby able to select the radius of said circular gliding flight path of said model airplane; wherein said flexible rudder control still retains said flexing capability to automatically, continuously and reversibly, change its angle with respect to the body of the model airplane as the air speed changes, whereby controlling said model airplane in said high speed take-off in a straight line and controlling said model airplane in a smooth transition from said high speed take-off to said slow circular gliding path.

4. An automatic pilot system as defined in claim 2, wherein said flexible sections of said flexible elevator control element are attached to the trailing edge of said horizontal stabilizer of said model airplane at a fixed angle with respect to said horizontal stabilizer of said model airplane; this attachment angle is determined by test flights of said model airplane that provides the longest possible gliding flight; wherein said flexible elevator control element still retains said flexing capability to automatically, continuously and reversibly, change its angle with respect to said horizontal stabilizer of said model airplane as the air speed changes, whereby controlling said model airplane to have a low angle of attack during the high speed take-off and subsequently attain a higher angle of attack during said low speed glide resulting in the longest possible gliding flight.

5. An automatic pilot system as defined in claim 2, wherein said flexible sections of said flexible wing tip control element are attached to the tip of each of said fixed wings of said model airplane at a fixed dihedral angle with respect to said fix wing of said model airplane; this attachment angle is determined by test flights of said model airplane that provides a stable flight in a calm wind as well as in a turbulent wind condition; whereby said flexible wing tip increases the overall dihedral angle of said fixed wing when said model airplane is at rest; wherein said flexible wing tip control still retains said flexing capability to automatically, continuously and reversibly, change its angle with respect to said fix wing of said model airplane as the air speed changes; whereby the lateral stability of said model airplane is enhanced by increasing its dihedral angle when a slide slip of said model airplane occurs either during said high speed take-off in a straight line or during said slow circular gliding path.

6. An automatic pilot system as defined in claim 1, further comprising a movable nose balancing weight shaped as a screw hidden in the nose of said airplane, wherein the position of said balancing weight is adjustable through an access orifice by turning said screw, whereby the pitch angle can be adjusted.

7. An automatic pilot system as defined in claim 1, wherein said flexible control elements are made out of thin flexible and transparent plastic material; whereby the original aesthetic visual appearance of said model airplane is preserved during flight, since from a distance the user of said model airplane can not see said externally attached transparent flexible control elements.

* * * * *